United States Patent [19]

Eggerstedt

[11] Patent Number: 4,909,813

[45] Date of Patent: Mar. 20, 1990

[54] JET PULSE EXTENDER

[75] Inventor: Paul Eggerstedt, North Riverside, Ill.

[73] Assignee: Industrial Filter & Pump Mfg. Co., Cicero, Ill.

[21] Appl. No.: 357,890

[22] Filed: May 30, 1989

[51] Int. Cl.⁴ .............................................. B01D 46/04
[52] U.S. Cl. ......................................... 55/302; 55/525
[58] Field of Search ........................... 55/302, 523, 525

[56] References Cited

U.S. PATENT DOCUMENTS

| 4,278,454 | 7/1981 | Nemesi | 55/302 |
| 4,356,010 | 10/1982 | Riemsloh | 55/302 |
| 4,637,473 | 1/1987 | Millis et al. | 55/302 X |

Primary Examiner—Charles Hart
Attorney, Agent, or Firm—Edmond T. Patnaude

[57] ABSTRACT

A multi-apertured flow control device is mounted over the exit end of a tubular filter element and is provided with a central bore through which a high velocity gas pulse is directed into the associated filter tube to dislodge a filter cake deposited on the exterior of the filter tube.

8 Claims, 1 Drawing Sheet

U.S. Patent
Mar. 20, 1990
4,909,813
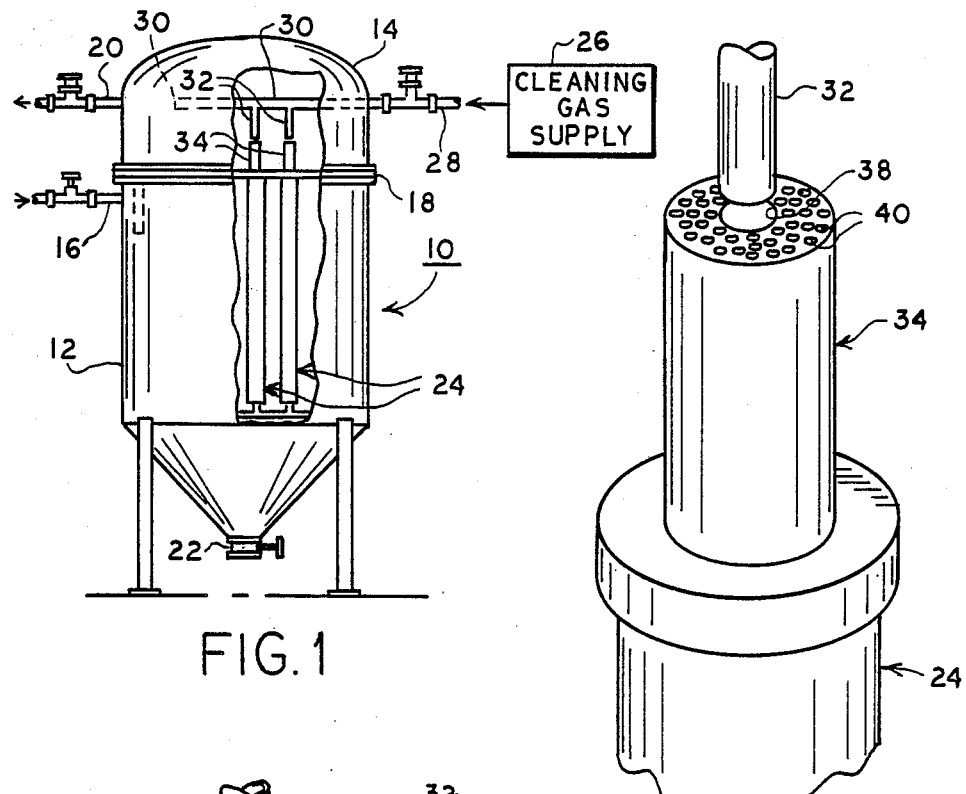
FIG. 1
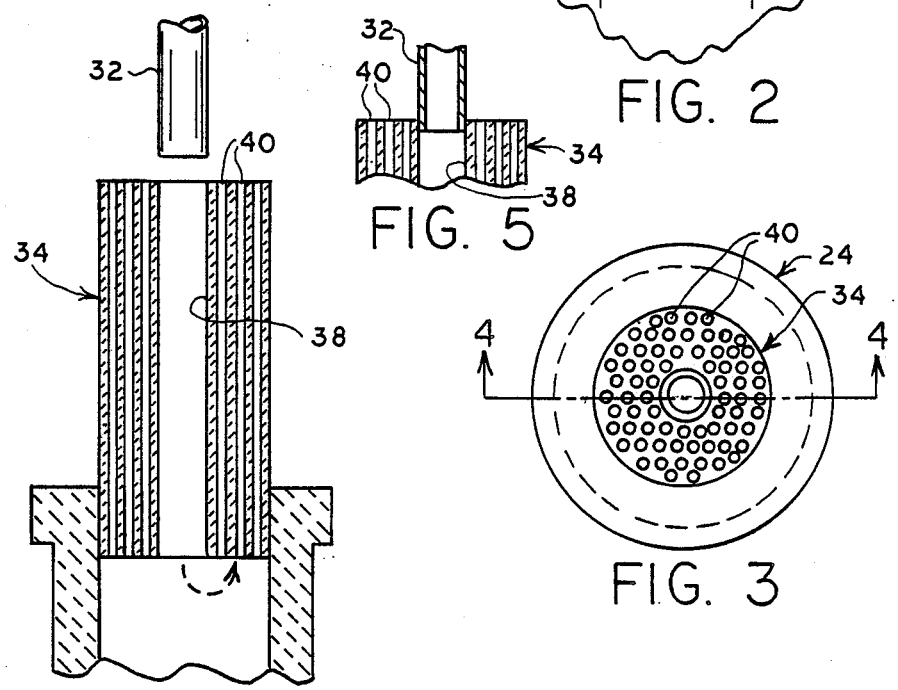
FIG. 2
FIG. 5
FIG. 4
FIG. 3

JET PULSE EXTENDER

The present invention relates in general to pressure filters of the type in which a gas is purified by the passage thereof through a tubular filter element, and it relates more particularly to a new and improved method and apparatus for removing a filter cake from the outer surface of a tubular filter element by directing a high velocity stream of gas in a reverse direction through the filter element.

BACKGROUND OF THE INVENTION

Although it is well known in the art of filtration to clean filter elements by passing fluid in a reverse direction through the filter elements, the use of this method for cleaning high temperature gas filters has not been successful in some applications where a very fine filter cake adheres to the filter element in a particularly tenacious manner. This is known to occur, for example, where the gas contains an undue amount of moisture so that the cake is relatively wet.

It is known to blow high velocity pulses of gas directly into the outlet side of a bank of filter tubes to momentarily cause a reverse flow of gas through some or all of the filter elements while the filter remains on line. However, in some cases the cleaning gas thus introduced into the filter tubes does not penetrate the walls of the filter elements but takes the path of least resistance and simply flows with the main gas stream out through the gas outlet port of the filter. Attempts to solve this problem have included such things as taking the filter off line during the cleaning operation or closing the outlet ports of a selected number of filter tubes while the high velocity cleaning gas is supplied to the downstream sides of the filters. While such techniques result in better cleaning operations, it would be still better if the cleaning operation could be carried out while the entire filter remains on line and without closing the outlet line from the filter tubes being cleaned. Also in high temperature applications it may be difficult to provide a valve or other means of closing off the filter outlet.

SUMMARY OF THE INVENTION

Briefly, in accordance with the present invention a flow control device containing a plurality of apertures or orifices is mounted over the open, downstream end of a filter tube in the path of the normal flow of gas through the filter such that during the normal filtering operation the gas which flows through the filter elements must flow through the apertures before exiting the filter. An additional opening is provided in the flow control device, and a jet pulse tube is positioned so as to direct a high velocity jet of gas through the opening in the flow control device into the filter tube. The length of the control device and thus the length of the orifices and the cross-sectional areas thereof must be selected so that the flow control device does not provide too great a pressure drop during normal filter operation but restricts the flow of the cleaning gas directly from the outlet port of the filter through the flow control device.

This novel method and apparatus is thus able to improve the efficiency of the backflow cleaning operation because the pressure drop through the orifices in the control device is approximately directly proportional to the square of the velocity of the gas flowing therethrough. Since the gas is at a much higher velocity during the cleaning operation than it is during normal filtration the effect of the control device on the gas is much greater than on the flow of gas being filtered.

GENERAL DESCRIPTION OF THE DRAWINGS

Further objects and advantages and a better understanding of the present invention will be had by reference to the following detailed description taken in connection with the accompanying drawings wherein:

FIG. 1 is an elevational view of a filter embodying the present invention, a portion of the tank being broken away to show the filter elements;

FIG. 2 is an isometric view of a portion of a filter element with which a flow control device embodying the present invention is incorporated;

FIG. 3 is a top view of the filter and flow control device shown in FIG. 2;

FIG. 4 is a sectional view taken along the line 4—4 of FIG. 3; and

FIG. 5 is a fragmentary cross sectional view of an alternative embodiment of the invention.

DETAILED DESCRIPTION OF A PREFERRED EMBODIMENT

Referring particularly to FIG. 1 there is shown a pressure filter 10 comprising a tank 12 over the top of which is sealably mounted a cover 14. A gas inlet duct 16 is adapted to supply a gas to be filtered to the chamber in the tank 12. A tube sheet 18 extends across the top of the tank below the cover 14 and divides the space within the tank into an upper chamber within the cover and a lower chamber into which the duct 16 opens. A gas outlet duct 20 opens into the chamber within the cover 14.

In order to remove particulate matter suspended in the gas supplied to the filter through the inlet 16, a plurality of tubular filter elements 24 depend through the tube sheet 18 into the chamber below the tube sheet with the exterior sides of the filter tubes being sealed to the tube sheet. The upper ends of the filter tubes open into the upper chamber. Accordingly, during a filter cycle gas flows from the lower chamber to the upper chamber through the filter elements, and any particulates which are larger than the pores in the filter tubes and are entrained in the gas are collected in the form of porous cakes on the external surfaces of the walls of the filter tubes.

As may be seen in FIG. 1, the lower portion of the tank is generally conical and provides a sump in which the particulates which are filtered from the gas collect after removal from the filter elements in a filter cleaning operation wherein a cleaning gas is passed through the filter elements in a reverse direction to dislodge the filter cakes which had been deposited thereon. A valve 22 is provided over a discharge opening at the bottom of the tank for use in the removal of the solid material from the tank.

As described above, the filter elements are cleaned by flowing gas through the filter elements in a reverse direction. Accordingly, a source of cleaning gas at a pressure greater than that in the lower chamber during the normal filtration cycle is provided and is shown schematically at 26. A duct 28 is provided to couple the cleaning gas from the supply 26 to a manifold 30 suitably mounted in the cover. The manifold 30 is coupled to each of the filter elements 24 by a plurality of depending tubes 32. As described in greater detail hereinafter, and in accordance with a important feature of the present invention a plurality of flow control devices 34 are connected between the tubes 32 and the filter tubes 24 for the purpose of improving the efficiency of the cleaning operation by preventing the cleaning gas from flowing directly to the outlet duct 20 instead of through the filter elements to dislodge the filter cakes therefrom.

Referring now to FIGS. 2, 3 and 4 wherein one of the filter elements 24 and its associated flow control device 34 is shown, it will be seen that the flow control device 34 is an elongated member having a longitudinal bore 38 extending therethrough in axial alignment with the central longitudinal axis of the associated filter element 24 and with the associated one of the tubes 32. The device 34 is provided with a plurality of mutually parallel, rectilinear orifices 40 which extend from the top of the device to the bottom so as to open onto the interior of the associated filter tube 24. During normal operation of the filter the filtered gas passes from the interiors of the filter tubes 24 through the orifices 40 in the flow control devices 34 to the chamber in the cover 14 and thus to the outlet duct 20. During a cleaning operation a high velocity pulse of gas flows from the supply 26 into the manifold 30 to the tubes 32. From the tubes 32 it flows into the bores 38 and thus into the filter tubes. Because the pressure of the cleaning gas is greater than the pressure in the lower chamber in the tank 12 the cleaning gas flows outwardly through the filter tubes and dislodges the filter cakes which were deposited on the exterior surfaces of the filter tubes.

The pressure drop through the orifices is defined by the following equation:

$$\text{Pressure drop} = f \frac{l \times v^2}{d \times 2g}$$

wherein
f = friction factor
l = length of the orifice
v = velocity of the gas through the orifice
d = diameter of the orifices
g = acceleration of gravity It thus may be seen that the pressure drop across the flow control device is proportional to the square of the velocity of the gas flowing through the orifice. Therefore, during the cleaning cycle when the gas flows into the filter tubes at a much greater velocity than during the filter cycle for it to exit therefrom through the orifices it would have to overcome a much greater pressure drop than is encountered by the gas flowing through the orifices during the normal filter cycle. The length and diameters of the orifices 40 are chosen to provide the optimum flow resistance for the filter and cleaning cycles. In addition to the greater resistance presented to the flow of gas from the filter tubes by the flow devices 34 there is an additional deterrent to the flow of the cleaning gas up through the orifices. That is because the cleaning gas flows down into the filter tubes and would have to be completely redirected in order to flow upwardly out of the filter tubes.

In the embodiment of the invention shown in FIGS. 2 and 3 the lower end of the tube 32 is spaced a short distance above the top of the bore 38 so as to educt gas from the upper chamber during the flow of the high velocity gas from the tube 32 into the bore 38. The additional gas which is thus added to the cleaning gas adds to the mass of gas which flows in a reverse direction through the filter tubes during the cleaning cycle.

Referring to FIG. 5 there is shown an alternative embodiment of the invention wherein the tube 32 fits tightly into the upper end of the bore 38. If desired, the tube 32 may be cemented to the flow control device 34 and removably connected at its other end of the manifold 30 shown in FIG. 1. In this embodiment of the invention all of the cleaning gas must flow down through the bore 38, there being no chance of its flowing directly to the outlet duct without passing through the flow control device 34 irrespective of the tenacity of the filter cake deposited on the exterior wall of the filter tube 24.

The present invention is well suited for use with high temperature gasses as found, for example, in combustion systems. Accordingly, the flow control device 34 may be a ceramic part which is bonded to the associated filter tube 24 which may also be ceramic. However, while the filter tube 24 must be porous in order to function as a filter element, the ceramic from which the flow control device 34 is formed need not be porous. Preferably, the ceramic parts 24 and 34 are molded of the same material or of materials having the same coefficient of expansion so that they are not stressed and fractured as a result of the substantial temperature changes encountered during use in high temperature applications.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:

1. A flow control device for use with a porous filter tube into which a gas is passed through the wall thereof to deposit particulate matter on the outer surface of the filter tube, and into one end of which cleaning gas is supplied to remove the deposited particulate matter from the filter tube by a reverse flow of gas through the wall of the filter tube, comprising
    a flow control device disposed over said one end of said tube,
    said flow control device having a first opening extending therethrough through which said cleaning gas may be supplied to the interior of said tube, and
    said flow control device having a plurality of orifices extending therethrough which open at one end into said filter tube.

2. The apparatus set forth in claim 1, wherein said flow control device is bonded to said filter tube.

3. The apparatus set forth in claim 1, wherein said flow control and said filter tube are formed of ceramic and are mutually affixed.

4. The apparatus set forth in claim 3, wherein said orifices are mutually parallel and said orifices extend parallel to said opening in said flow control device.

5. The apparatus set forth in claim 1, wherein said opening is rectilinear and is aligned with the central longitudinal axis of said filter tube.

6. A filter, comprising in combination
    a tank,
    a tube sheet extending across said tank and dividing it into first and second chambers,
    at least one tubular filter element sealably mounted in an opening in said tube sheet with said tube extending into said first compartment and the interior of said tubular filter element opening into said second compartment, a gas inlet opening into said first compartment for supplying gas to be filtered to said first compartment, a gas outlet opening into said second compartment for carrying filtered gas from said second compartment to the exterior of said filter, a source of cleaning gas, and a flow control device positioned between the interior of said tubular filter element and said second compartment and having an opening therethrough connected between said source of cleaning gas and the interior of said tubular filter element, said flow control device having a plurality of orifices extending therethrough for carrying gas between the interior of said tubular filter element and said second compartment.

7. The filter set forth in claim 6, comprising a conduit disposed in said second compartment and connected to said source of gas for carrying said cleaning gas to the interior of said tubular filter element, said conduit being spaced from said flow control device.

8. The filter set forth in claim 6 comprising a conduit disposed in said second compartment and connected to said source of gas for carrying said cleaning gas to the interior of said tubular filter element, said conduit extending into abutment with said flow control device throughout an area surrounding said opening in said control device.

* * * * *

UNITED STATES PATENT AND TRADEMARK OFFICE
CERTIFICATE OF CORRECTION

PATENT NO. : 4,909,813
DATED : March 20, 1990
INVENTOR(S) : Paul Eggerstedt

It is certified that error appears in the above-identified patent and that said Letters Patent is hereby corrected as shown below:

Column 4, line 53, after "control" insert -device-.

Signed and Sealed this

Fourteenth Day of January, 1992

Attest:

HARRY F. MANBECK, JR.

*Attesting Officer*   *Commissioner of Patents and Trademarks*